United States Patent
Sakai et al.

(10) Patent No.: US 9,180,769 B2
(45) Date of Patent: Nov. 10, 2015

(54) VEHICLE CONTROL SYSTEM

(75) Inventors: Kohei Sakai, Saitama (JP); Daihei Teshima, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 810 days.

(21) Appl. No.: 13/501,429

(22) PCT Filed: Nov. 17, 2010

(86) PCT No.: PCT/JP2010/070511
§ 371 (c)(1),
(2), (4) Date: Apr. 11, 2012

(87) PCT Pub. No.: WO2011/062204
PCT Pub. Date: May 26, 2011

(65) Prior Publication Data
US 2012/0209495 A1 Aug. 16, 2012

(30) Foreign Application Priority Data

Nov. 18, 2009 (JP) .................. 2009-262910

(51) Int. Cl.
| B60W 20/00 | (2006.01) |
| B60K 6/485 | (2007.10) |
| B60K 6/543 | (2007.10) |
| B60W 10/107 | (2012.01) |
| B60W 10/30 | (2006.01) |
| B60W 30/18 | (2012.01) |
| F02D 29/02 | (2006.01) |
| F16H 61/00 | (2006.01) |

(52) U.S. Cl.
CPC ............. *B60K 6/485* (2013.01); *B60K 6/543* (2013.01); *B60W 10/107* (2013.01); *B60W 10/30* (2013.01); *B60W 30/18018* (2013.01); *F02D 29/02* (2013.01); *F16H 61/0031* (2013.01); *B60W 20/00* (2013.01); *B60W 2520/10* (2013.01); *B60W 2520/105* (2013.01); *F16H 2312/14* (2013.01); *Y02T 10/48* (2013.01); *Y02T 10/6226* (2013.01)

(58) Field of Classification Search
CPC ............ B60W 30/18018; B60W 10/30; F16H 2312/14
See application file for complete search history.

(56) References Cited

U.S. PATENT DOCUMENTS

| 6,840,889 B2 | 1/2005 | Aoki et al. |
| 7,041,030 B2 * | 5/2006 | Kuroda et al. .................. 477/21 |

FOREIGN PATENT DOCUMENTS

| JP | 2005-147048 A | 6/2005 |
| JP | 2006-161565 A | 6/2006 |
| JP | 2007-232115 A | 9/2007 |
| JP | 2010-149630 A | 7/2010 |

OTHER PUBLICATIONS

Chinese Office Action issued in Application No. 201080043583.6, dated Dec. 30, 2013, 6 pages.

* cited by examiner

*Primary Examiner* — Derek D Knight
(74) *Attorney, Agent, or Firm* — Westerman, Hattori, Daniels & Adrian, LLP

(57) ABSTRACT

There is provided a control system for a vehicle, wherein the control system controls an electric oil pump of the vehicle to start before an idling stop is brought about, when a condition on a vehicle speed is satisfied which is set in accordance with a variation of a running speed of the vehicle while the vehicle is running based on the driving force generated by a driving force generation unit thereof. Consequently, the electric oil pump can be started at an optimum timing before the idling stop is brought about.

5 Claims, 13 Drawing Sheets

VEHICLE CONTROL SYSTEM

CROSS-REFERENCE TO RELATED APPLICATION

This Application is a National Stage entry of International Application No. PCT/JP2010/070511, having an international filing date of Nov. 17, 2010; which claims priority to Japanese Application No.: 2009-262910, filed Nov. 18, 2009; the disclosure of each of which is hereby incorporated in its entirety by reference.

TECHNICAL FIELD

The present invention relates to a vehicle control system which starts an electric oil pump before an idling stop is brought about.

BACKGROUND ART

A vehicle engine control unit disclosed in Patent Literature 1 includes an electric oil pump in addition to an oil pump provided for a drive line to supply a controlling hydraulic pressure to a power transmission system such as a continuously variable transmission. In this engine control unit, the electric oil pump is stopped after an engine stop control operation is executed. Because of this, even when the oil pump is stopped as a result of the engine being stopped, working fluid is supplied to the power transmission system by means of the operation of the electric oil pump. As a result, the occurrence of a function failure in the power transmission system can be prevented which would otherwise occur when the engine is stopped, thereby making it possible to prevent the occurrence of a power transmission failure when the vehicle is started again.

The engine control unit executes an idling stop control routine shown in FIG. 12. In the idling stop control routine, as shown in FIG. 12, in step s1, vehicle's operating information (data) is inputted from respective sensors and is then stored. In s2, it is determined whether or not the engine is running where an engine revolution speed Ne exceeds a predetermined value Ne1 which is a start determination value. If it is determined that the engine is running, the routine proceeds to step s3, whereas if it is determined that the engine is stopped, the routine proceeds to step s4. When the routine reaches step s4 as a result of the engine being stopped, it is determined whether or not a key-on signal or start signals Ss, Sk have been inputted as a result of an engine starting condition being met. If No, the routine returns to the main routine.

When the routine proceeds to step s3 as a result of it being determined that the engine is running in step s2, an engine stop permissive vehicle speed setting operation is executed. In the engine stop permissive vehicle speed setting operation, a subtracted value δV is obtained from the current vehicle speed Vcn and a vehicle speed Vcn-1 which resulted a certain length of time ago, deceleration–α=δV/δt is calculated, and an engine stop permissive vehicle speed Vo corresponding to the deceleration–α is operated by use of a permissive vehicle speed setting map mp1. Then, the routine proceeds to step s6.

In step s6, the engine stop control operation is executed. As shown in FIG. 13, in the engine stop control operation routine, in step b1, it is determined whether or not the deceleration–α is equal to or smaller than a stop enablement determination value –α1. If Yes, and when it is considered that the deceleration–α stays within a braking mode which does not make the driver or an occupant feel a sensation of physical disorder that he or she normally feels, the routine proceeds to step b2.

In step b2, it is determined whether or not the current vehicle speed Vcn is equal to or smaller than the engine stop permissive vehicle speed Vo. If Yes and when it is determined that the vehicle speed stays within a braking mode which can permit an automatic stop control, the routine proceeds to step b3. On the contrary, if it is determined that the vehicle speed is in a driving region where the automatic stop control is to be canceled, the routine returns to the main routine with doing nothing.

In step b3, it is determined whether or not a brake pedal is being depressed (a depression signal Sb ON). If it is determined as ON, the routine proceeds to step b4, whereas if OFF, the automatic stop condition is not satisfied, and the routine returns to the main routine with do nothing. In step b4, as a result of the automatic stop condition being established, a fuel supply system and an ignition system are stopped, and even in the event that the vehicle speed Vc is not zero, an engine stop is executed, the routing returning to the idling stop control routine.

After step s6, the routine proceeds to step s7. In step s7, the electric oil pump is driven which supplies a controlling hydraulic pressure to the power transmission system such as a continuously variable transmission, and the routine returns to the main routine. This operation drives the electric oil pump to enable the working hydraulic pressure to be supplied to a hydraulic pressure switching mechanism when the engine is stopped even in the event that the oil pump of the drive line is stopped as a result of the engine being stopped.

RELATED ART LITERATURE

Patent Literature

Patent Literature 1: JP-2005-147048-A

SUMMARY OF THE INVENTION

Problem that the Invention is to Solve

As described above, in the engine control unit of Patent Literature 1, after the engine stop controlling operation is executed in step s6, the electric oil pump is driven in step s7. However, although the electric oil pump is driven immediately after the engine is stopped, a sufficient controlling hydraulic pressure can not always be supplied to the power transmission system. Because of this, when an idling stop is brought about immediately after the vehicle is stopped, it is desirable that the electric oil pump is driven before the engine is stopped. However, when the electric oil pump is driven before the vehicle is stopped, more electric power is consumed than when the electric oil pump is driven after the vehicle is stopped. Consequently, in order to reduce consumed electric power, the electric oil pump needs to be started at a timing matching the running condition of the vehicle.

An object of the invention is to provide a vehicle control system which can start an electric oil pump at an optimum timing before an idling stop is brought about.

Means for Solving the Problem

Claim 1 provides a control system (e.g., a management ECU 117 in embodiment) for a vehicle, the vehicle including:
a driving force generation unit (e.g., an electric motor 101 and an internal combustion engine 103 in embodiment) which includes at least an internal combustion engine (e.g., the internal combustion engine 103 in embodiment) as a drive source;

an automatic transmission (e.g., a continuously variable transmission 105 in embodiment) which changes a ratio of a rotation speed of an input shaft to which a driving force is inputted from the driving force generation portion to a rotation speed of an output shaft;

an electric oil pump (e.g., an electric oil pump 109 in embodiment) which is driven by electric power supplied from a battery to supply a working hydraulic pressure to the automatic transmission; and a vehicle speed detection unit (e.g., revolution speed sensor 111a, 111b and the management ECU 117 in embodiment), wherein the control system executes an idling stop in the driving force generation unit, and wherein the control system controls the electric oil pump to start before the idling stop is brought about, when a condition on a vehicle speed is satisfied which is set in accordance with a variation of a running speed of the vehicle while the vehicle is running based on the driving force generated by the driving force generation unit.

Claim 2 provides, based on Claim 1, the control system, wherein a vehicle speed designated by the condition which is set when the vehicle is being decelerated is set low when the variation in running speed of the vehicle is small and is set high when the variation is large, and wherein the control system controls the electric oil pump to start when the running speed of the vehicle decreases to the vehicle speed designated by the condition.

Claim 3 provides, based on Claim 1 or 2, the control system, wherein a vehicle speed designated by the condition which is set when the vehicle is shifted to be accelerated before an idling stop is brought about with the electric oil pump kept driven is set high when the variation in running speed of the vehicle is small and is set low when the variation is large, and wherein the control system controls the electric oil pump to stop when the running speed of the vehicle reaches to the vehicle speed designated by the condition.

Claim 4 provides, based on Claim 3, the control system, wherein a vehicle speed designated by the condition which is set when the vehicle is shifted to be accelerated is higher than a vehicle speed designated by the condition which is set when the vehicle is being decelerated.

Claim 5 provides, based on any of Claims 1 to 4, the control system, wherein the vehicle includes an oil temperature detection unit (e.g., an oil temperature sensor 119 in embodiment) which detects a temperature of a working oil that is supplied to the automatic transmission by the electric oil pump, wherein a condition on the vehicle speed is set in accordance with a variation in running speed of the vehicle and a temperature of the working oil, and wherein a vehicle speed designated by the condition is set lower as the temperature of the working oil increases higher in the event that the running speed of the vehicle stays constant.

Advantage of the Invention

According to Claims 1 to 2, in driving the electric oil pump before the idling stop is brought about, since the electric oil pump is controlled to be started at the optimum timing matching the variation in running speed of the vehicle, the consumed power can be suppressed.

According to Claims 3 to 4, in stopping the electric oil pump when the vehicle is shifted to be accelerated before the idling stop is brought about with the electric oil pump kept driven, the driving of the electric oil pump can be stopped at the optimum timing matching the variation in running speed of the vehicle.

According to Claim 5, it is taken into consideration that the time taken until the electric oil pump supplies a desired working hydraulic pressure to the automatic transmission differs depending upon the temperature of oil. Because of this, even in the event that the temperature of oil is so low that a delay in response is generated in an actual working hydraulic pressure that is supplied by the electric oil pump, the state can be attained in which the electric oil pump supplies a desired working hydraulic pressure to the automatic transmission before the idling stop is brought about.

MODE FOR CARRYING OUT THE INVENTION

Embodiments of the invention will be described by reference to the drawings.

An HEV (Hybrid Electrical Vehicle) runs on driving forces of an electric motor and/or an internal combustion engine. In an HEV that will be described below, a drive shaft of an electric motor is directly connected to a drive shaft of an internal combustion engine.

Figure 1:
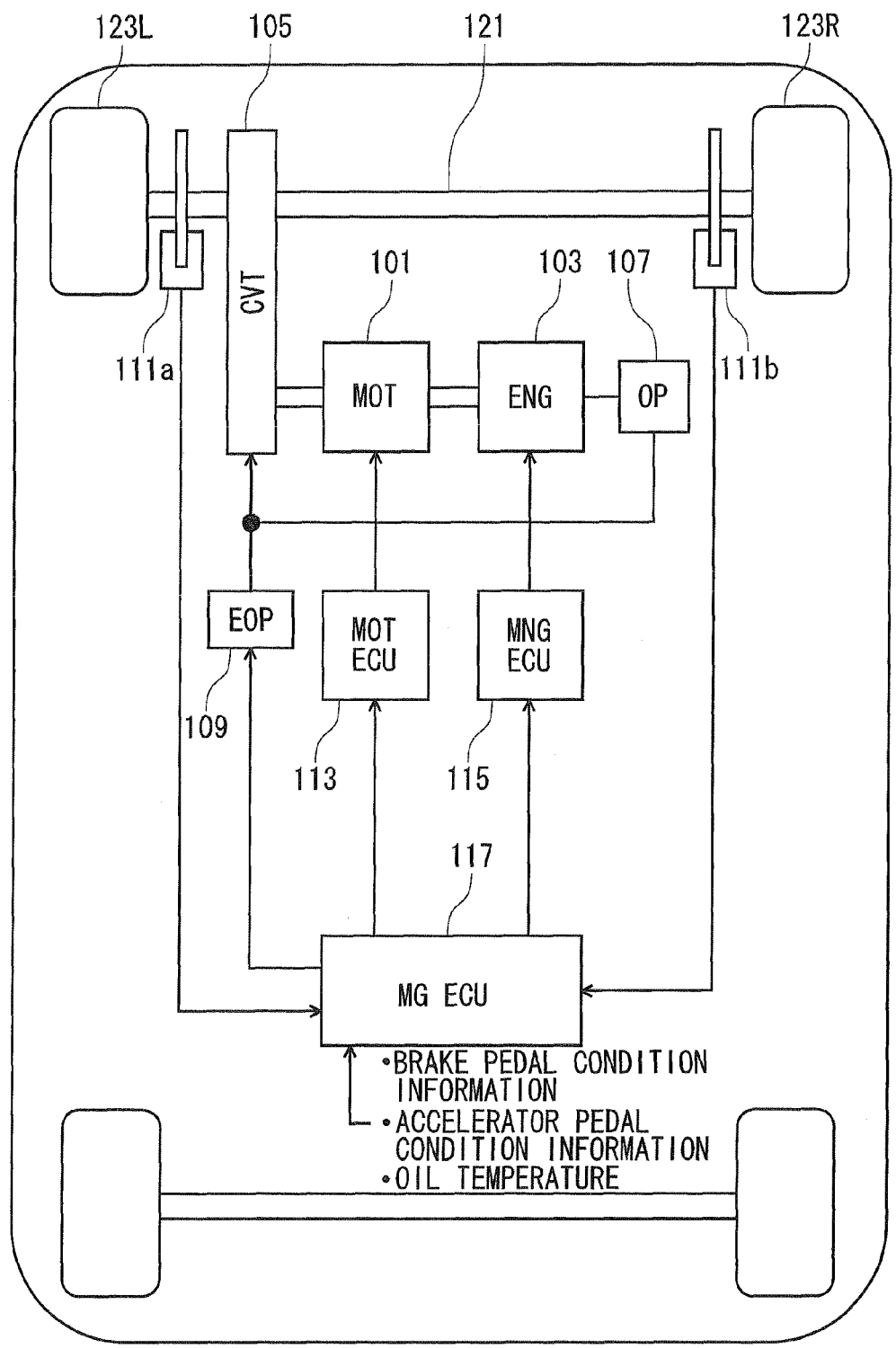
FIG. 1 is a block diagram showing an internal configuration of an HEV of an embodiment.

FIG. 1 is a block diagram showing an internal configuration of an HEV of an embodiment. The HEV (hereinafter, referred to simply as a "vehicle") shown in FIG. 1 includes an electric motor (MOT) 101, an internal combustion engine (ENG) 103, a belt type continuously variable transmission (CVT) which includes a torque converter, a mechanical oil pump (OP) 107, an electric oil pump (EOP) 109, rotation speed sensors 111a, 111b, a motor ECU (MOT ECU) 113, an engine ECU (ENG ECU) 115, and a management ECU (MG ECU) 117. Further, although not shown in FIG. 1, the vehicle includes a oil temperature sensor 119.

The electric motor 101 is, for example, a three-phase alternating current motor and generates a driving force which runs the vehicle. High-voltage (for example, 100 to 200 V) electric power is supplied to the electric motor 101 via an inverter, not shown. The internal combustion engine 103 generates a driving force which runs the vehicle. The driving forces supplied from the electric motor 101 and the internal combustion engine 103 are transmitted to dive wheels 123L, 123R via the CVT 105 and a drive shaft 121.

Figure 2:
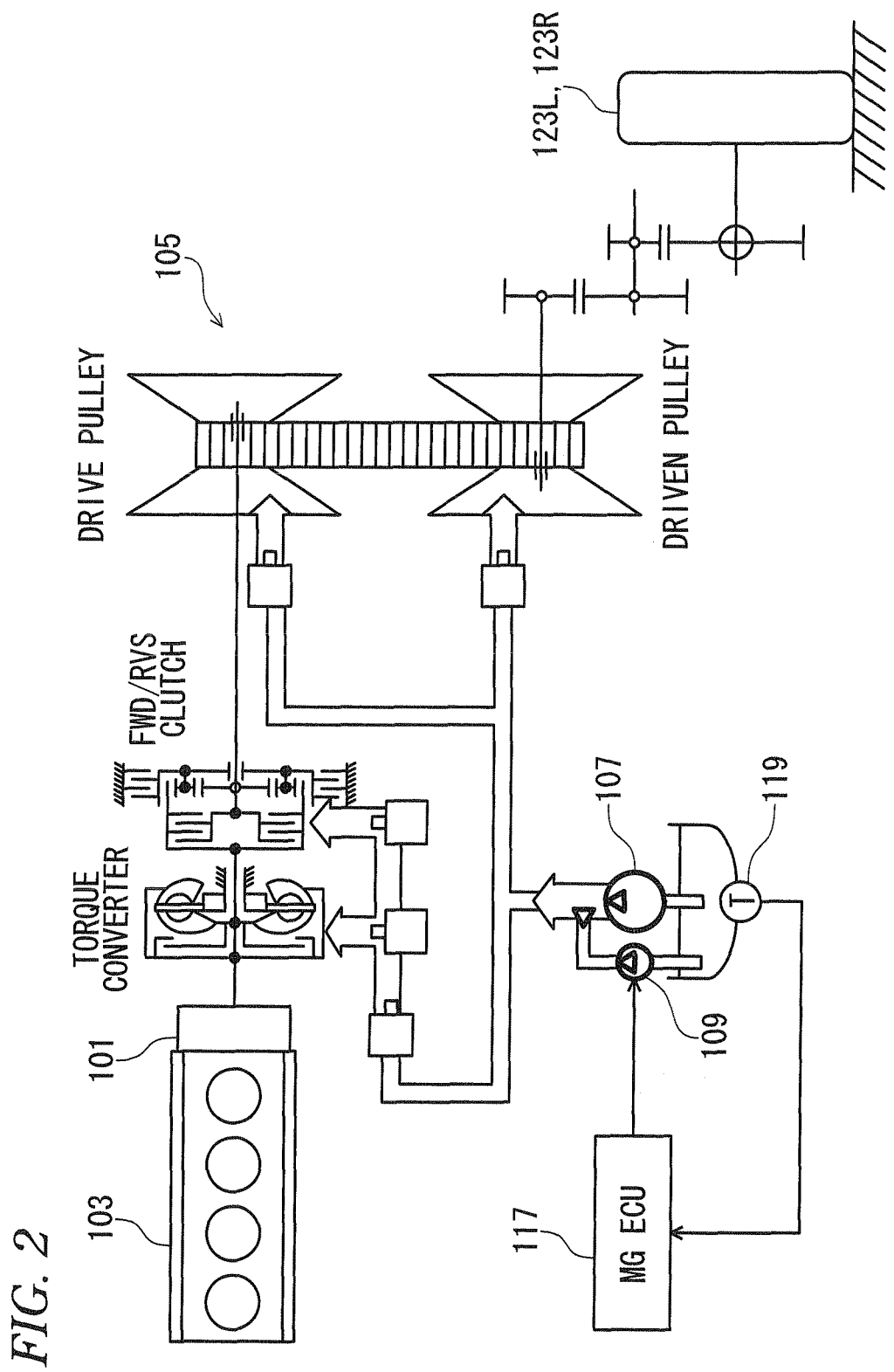
FIG. 2 is a diagram showing an internal configuration of a CVT 105 and a relation between each of an electric motor 101, an internal combustion engine 103, a mechanical oil pump 107, an electric oil pump 109, a management ECU 117 and drive wheels 123L, 123R and the CVT 105.

The CVT 105 converts the driving forces from the electric motor 101 and/or the internal combustion engine 103 into a rotating speed and torque at a desired gear ratio for transmission to the drive shaft 121. FIG. 2 is a diagram showing an internal configuration of a CVT 105 and a relation between each of the electric motor 101, the internal combustion engine 103, the mechanical oil pump 107, the electric oil pump 109, the management ECU 117 and the drive wheels 123L, 123R and the CVT 105. The mechanical oil pump 107 is driven in conjunction with the operation of the internal combustion engine 103 and supplies a predetermined oil or hydraulic pressure to the CVT 105. The electric oil pump 109 is driven by electric power supplied from a battery, not shown and supplies a predetermined oil or hydraulic pressure to the CVT 105.

As described above, the drive shaft of the electric motor 101 is directly connected to the drive shaft of the internal combustion engine 103. Because of this, although the internal combustion engine 103 is stopped, when the electric motor 101 is driven, the drive shaft of the internal combustion engine 103 is caused to rotate, which drives the mechanical oil pump 107, as well.

The oil temperature 119 detects a temperature of a working oil (hereinafter, referred to as an "oil temperature") which is used by the mechanical oil pump 117 and the electric oil pump 109. A signal indicating the oil temperature detected by the oil temperature sensor 119 is sent to the management ECU 117. The rotation speed sensors 111a, 111b detect rotation speeds of the drive wheels 123L, 123R. Signals indicating the rotation speeds of the drive wheels 123L, 123R which are detected by the rotation speed sensors 111a, 111b are sent to the management ECU 117.

The motor ECU 113 controls the operation of the electric motor 101. The engine ECU 115 controls the operation of the internal combustion engine 103. The management ECU 117 controls the electric motor 101 and the internal combustion engine 103. Additionally, inputted into the management ECU 117 are signals from the rotation speed sensors 111a, 111b and information regarding the depression of a brake pedal (brake pedal condition information) and information regarding the depression of an accelerator pedal (accelerator pedal condition information). In addition, the management ECU 117 calculates a running speed of the vehicle (hereinafter, referred to as a "vehicle speed") Vp based on the signals sent from the rotation speed sensors 111a, 111b. Further, the management ECU 117 calculates a deceleration or an acceleration from the vehicle speed Vp.

The management ECU 117 determines whether or not a prior-to-start condition of the electric oil pump 109 resulting before an idling stop is brought about is met based on the condition of the brake pedal and the condition of the accelerator pedal, as well as a condition of a vacuum servo unit, not shown. The vacuum servo unit is intended to assist the driver in terms of brake effort by making use of a vacuum or a negative pressure produced by air intake by the internal combustion engine. The management ECU 117 determines that the prior-to-start condition is satisfied when it verifies that the brake pedal is depressed, the negative pressure is equal to or larger than a predetermined value and the accelerator pedal is not depressed.

Figure 3:
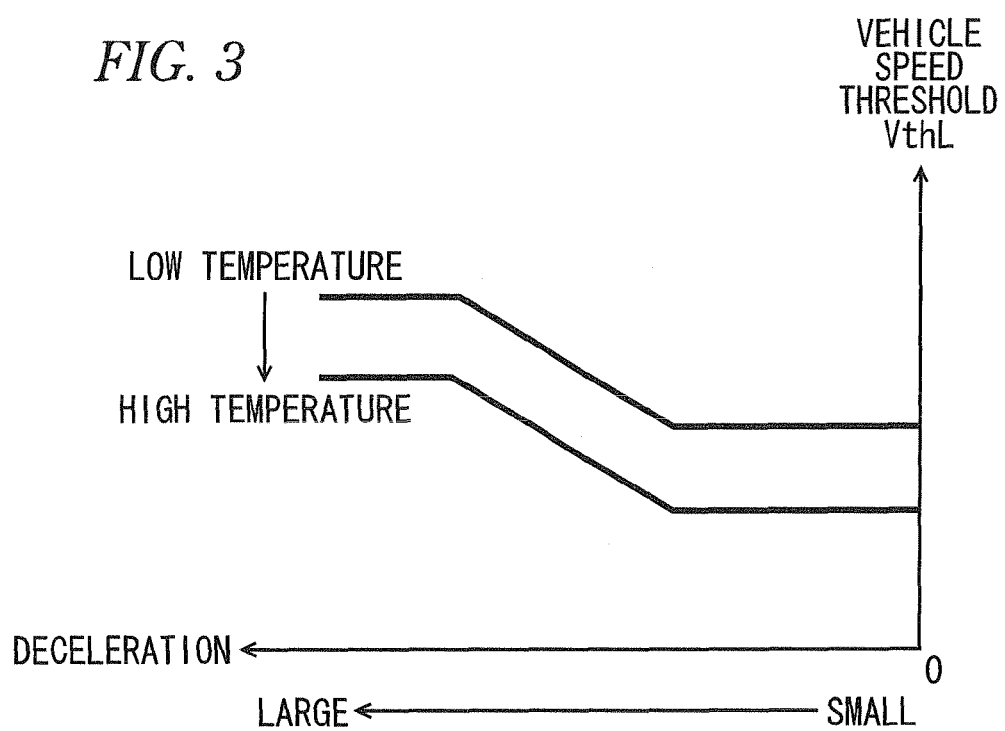
FIG. 3 is a graph showing a vehicle speed threshold VthL with respect to deceleration according to oil temperature.

After having determined that the prior-to-start condition is satisfied, the management ECU 117 calculates a vehicle speed threshold Vth for determination of a timing at which the electric oil pump 109 is started. The vehicle speed threshold VtL differs depending upon the deceleration of the vehicle and oil temperature. FIG. 3 is a graph showing a vehicle speed threshold VthL with respect to deceleration according to oil temperature. This graph is stored in a memory as a map. As shown in FIG. 3, the vehicle speed threshold VthL of a predetermined temperature varies in a stepping fashion as deceleration changes. The vehicle speed threshold VthL is set low when deceleration is small, whereas when deceleration is large, the vehicle speed threshold VthL is set high. This is because it is considered that the driver has a strong intention to stop the vehicle when deceleration is large, resulting in a high possibility that an idling stop is brought about after the vehicle is stopped. In addition, the vehicle speed threshold VthL of a predetermined deceleration is set higher as the oil temperature decreases lower. This is because when the oil temperature is low the viscosity of the working oil is high, generating a delay in response in supplying controlling hydraulic pressure by driving the electric oil pump 109.

When determining that the aforesaid prior-to-star condition is satisfied, the management ECU 117 controls the electric oil pump 109 to start at a point in time when the vehicle speed Vp is lowered to the vehicle speed threshold Vth. Thereafter, when the vehicle is stopped, the management ECU 117 instructs the engine ECU 115 to execute an idling stop.

Figure 4:
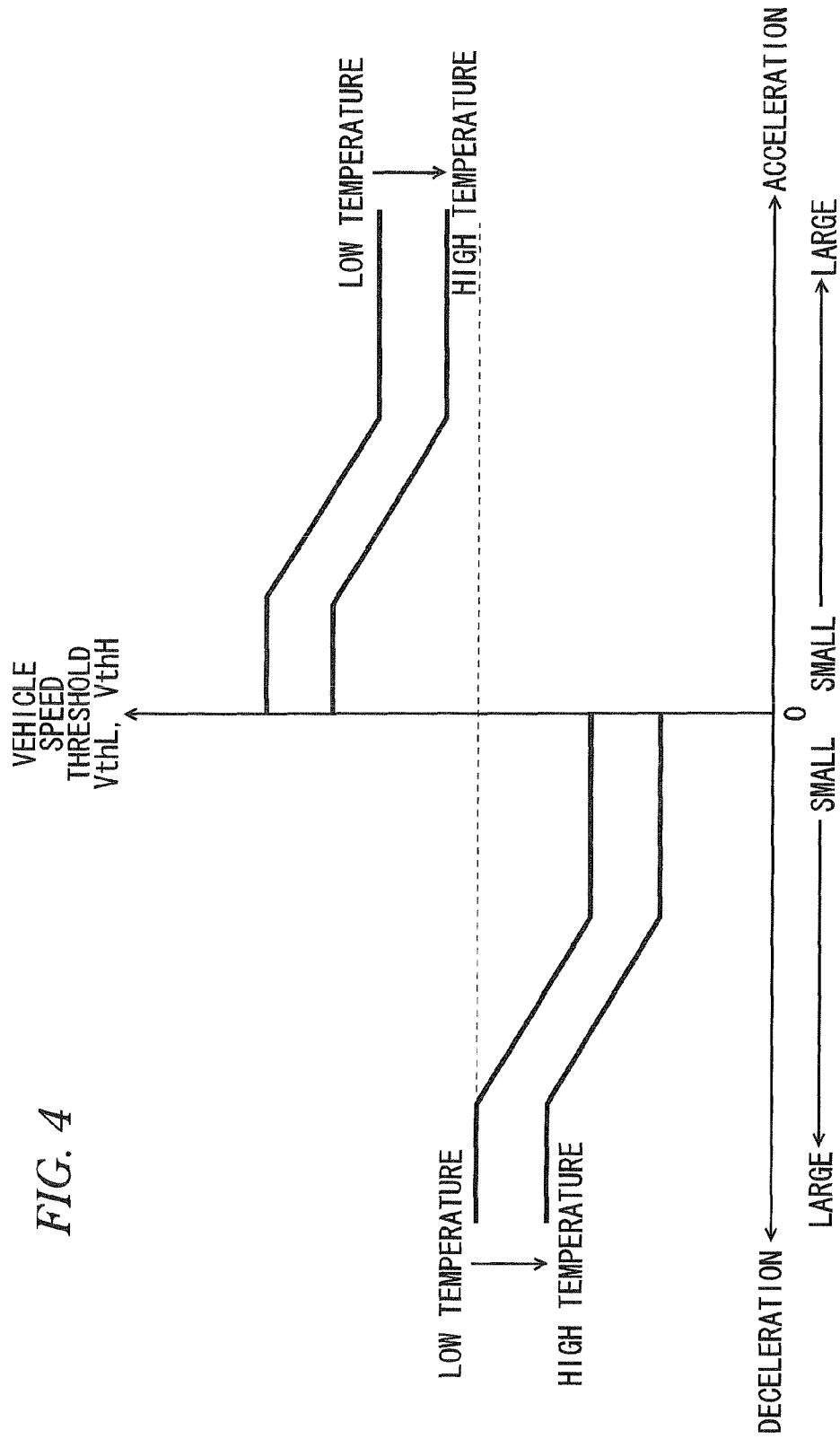
FIG. 4 is a graph showing a vehicle speed threshold VthH with respect to acceleration according to oil temperature, enabling a relative comparison with the vehicle speed threshold VthL.

On the other hand, when the vehicle is shifted to be accelerated before an idling stop is brought about with the electric oil pump 109 kept driven and the vehicle speed Vp, which is equal to or smaller than the vehicle speed threshold VthL, is raised to reach the vehicle speed threshold VthL, the management ECU 117 controls the electric oil pump 109 to stop. A vehicle speed threshold VthH also differs in accordance with the deceleration of the vehicle and the oil temperature. FIG. 4 is a graph showing a vehicle speed threshold VthH with respect to acceleration according to oil temperature, enabling a relative comparison with the vehicle speed threshold VthL. This graph is stored in the memory, not shown, as a map. As shown in FIG. 4, the vehicle speed threshold VthH of a predetermined temperature varies in a stepping fashion as acceleration changes. The vehicle speed threshold VthH is set high when acceleration is small, whereas when acceleration is large, the vehicle speed threshold VthH is set low. In addition, the vehicle speed threshold VthH of a predetermined acceleration is set lower as the oil temperature increases higher. The vehicle speed threshold VthH is set higher than the vehicle speed threshold VthL irrespective of acceleration and oil temperature.

Figure 5:
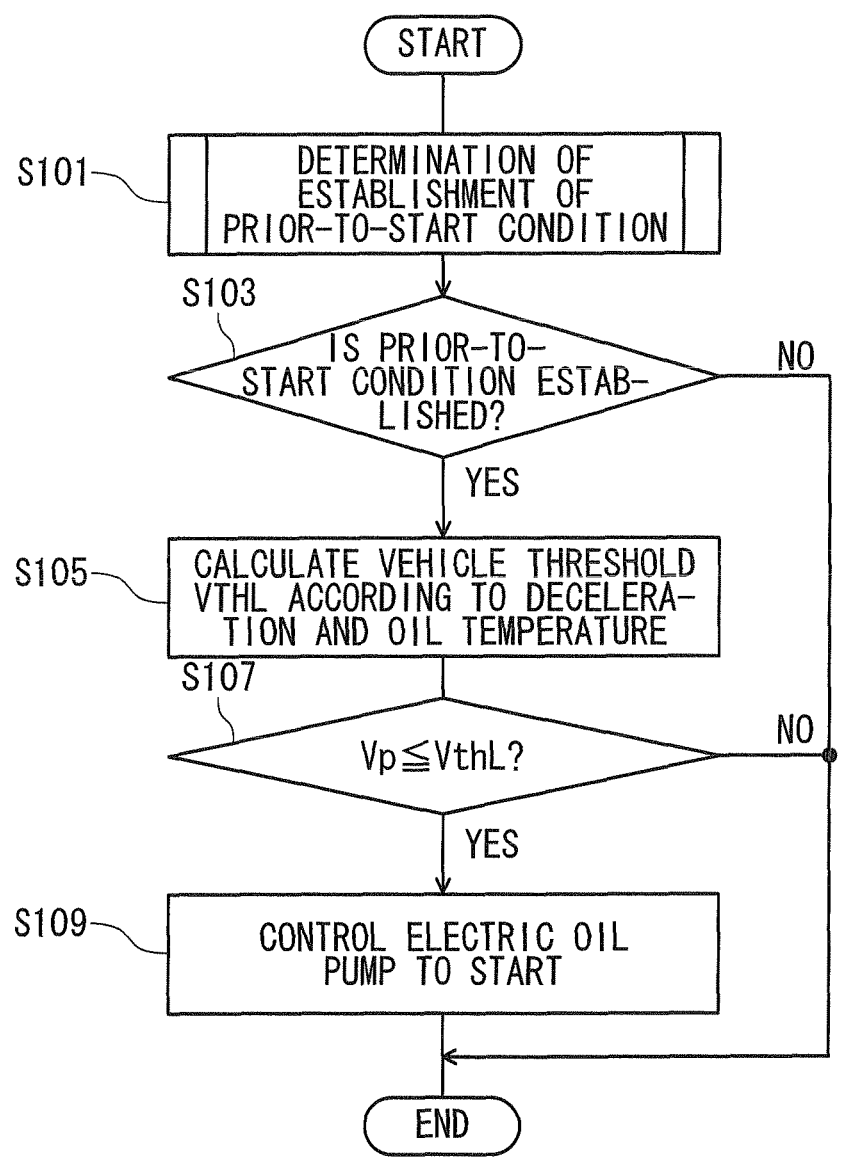
FIG. 5 is a flowchart showing operations performed by the management ECU 117 when the vehicle is being decelerated.
Figure 6:
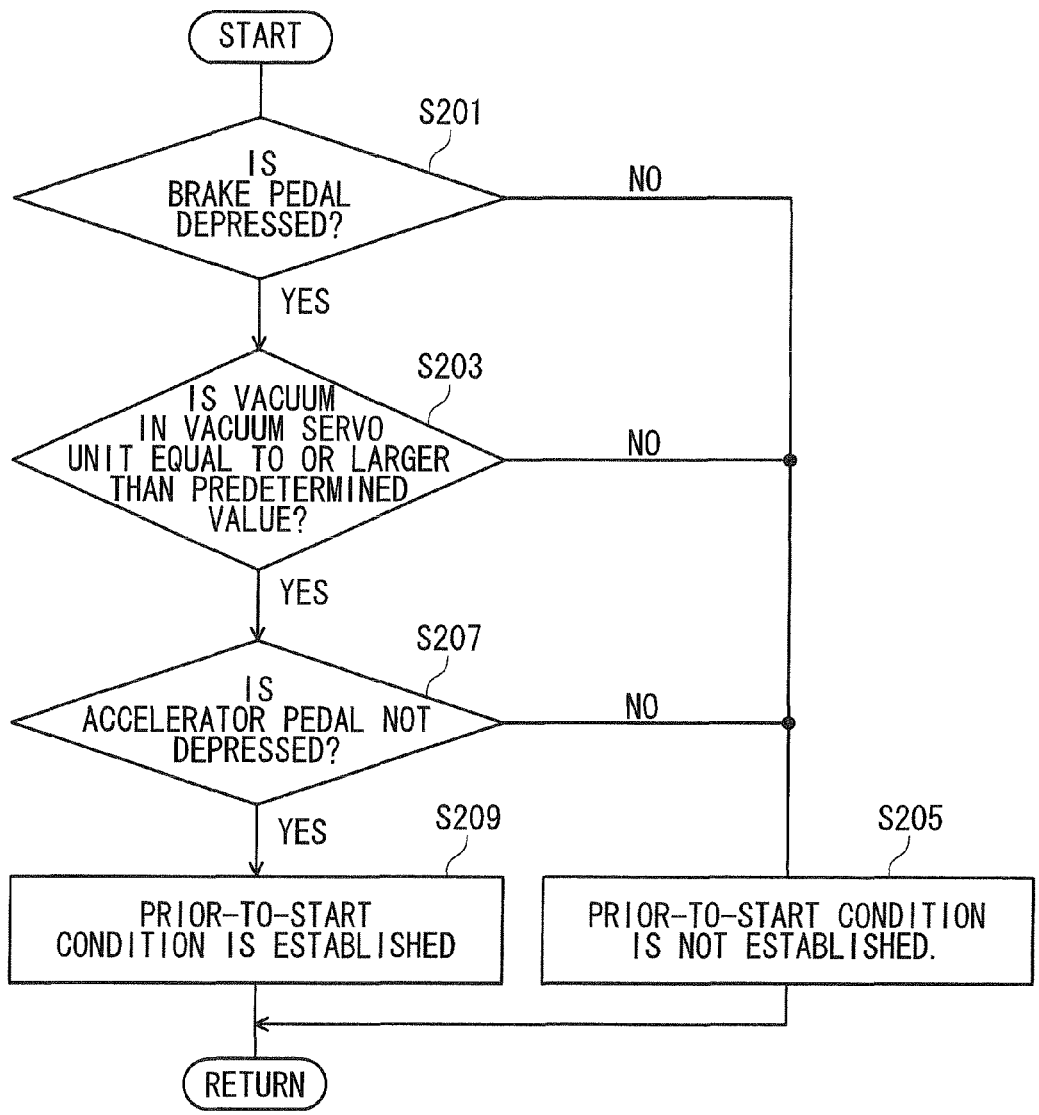
FIG. 6 is a flowchart showing a sub-routine which is executed in step S101 shown in FIG. 5.

FIG. 5 is a flowchart showing operations performed by the management ECU 117 when the vehicle is being decelerated. As shown in FIG. 5, the management ECU 117 determines whether or not the prior-to-start condition of the electric oil pump 109 before an idling stop is brought about is satisfied (step S101). FIG. 6 is a flowchart showing a sub-routine which is executed in step S101 shown in FIG. 5. As shown in FIG. 6, the management ECU 117 determines based on the brake pedal condition information whether or not the brake pedal is being depressed (step S201). If it is determined as a result of the determination that the brake pedal is being depressed, the routine proceeds to step S203, whereas if it is determined that the brake pedal is not depressed, the routine proceeds to step S205. In step S205, the management ECU 117 determines that the prior-to-start condition is not satisfied (the prior-to-start condition is not established), and the routine returns to the main routine.

In step S203, the management ECU 117 determines whether or not a vacuum in the vacuum servo unit is equal to or larger than a predetermined value. If it is determined as a result of the determination that the vacuum is equal to or larger than the predetermined value, the routine proceeds to step S207, whereas if it is determined that the vacuum is smaller than the predetermined value, the routine proceeds to step S205. In step S207, the management ECU 117 determines based on the accelerator condition information whether or not the accelerator pedal is being depressed. If it is determined as a result of the determination that the accelerator pedal is not depressed, the routine proceeds to step S209, whereas if it is determined that the accelerator pedal is being depressed, the routine proceeds to step S205. In step S209, the management ECU 117 determines that the prior-to-start condition is satisfied (the prior-to-start condition is established), and the routine returns to the main routine.

Next, if the management ECU 117 determines in step S103 that the prior-to-start condition determined in step S101 is established, the routine proceeds to step S105, whereas if the management ECU 117 determines that the condition is not established, this is the end of the series of operations. In step S105, the management ECU 117 calculates a vehicle speed threshold VthL according to the deceleration of the vehicle and the oil temperature by retrieving the maps. Next, the management ECU 117 compares the vehicle speed Vp with the vehicle speed threshold VthL (step S107). If it is determined as a result of the comparison that the vehicle speed Vp is equal to or smaller than the vehicle speed threshold VthL (Vp≤VthL), the routine proceeds to step S109. In step S109, the management ECU 117 starts to control the electric oil pump 109 to start.

Figure 7:
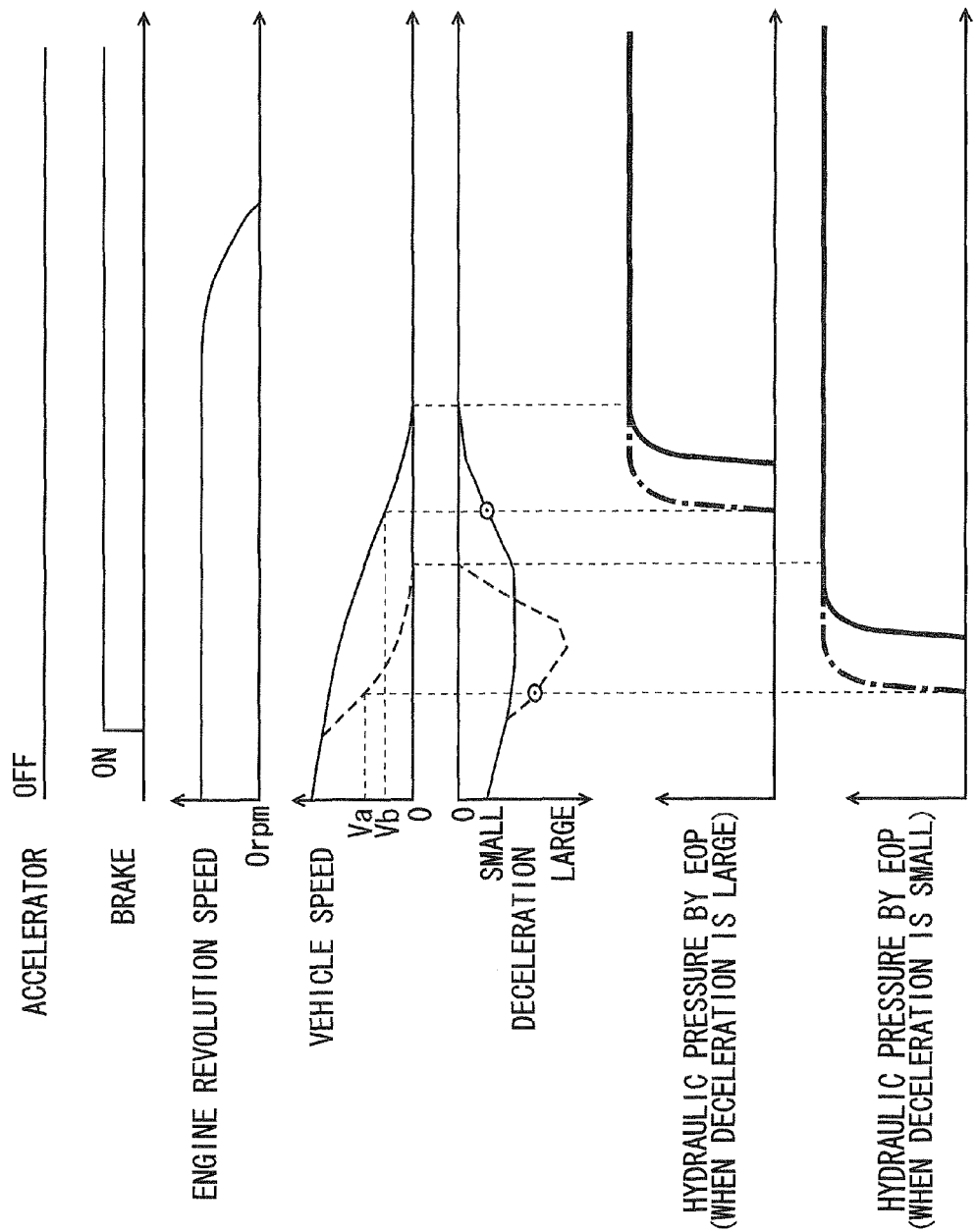
FIG. 7 is a time chart showing an example of a start timing of a start control of the electric oil pump 109 which is executed when the vehicle is being decelerated.

FIG. 7 is a time chart showing an example of a start timing of a start control of the electric oil pump 109 which is executed when the vehicle is being decelerated. As shown in FIG. 7, when the oil temperature stays constant in such a state that the accelerator pedal is not depressed and the brake pedal is being depressed, with the deceleration being large, the electric oil pump 109 is controlled to start when the vehicle speed is Va, whereas with the deceleration being small, the electric oil pump 109 is controlled to start when the vehicle speed is Vp which is smaller than the vehicle speed Va. Some time is necessary from the electric oil pump 109 is controlled to start until the electric oil pump 109 actually supplies a desired hydraulic pressure to the CVT 105. In the time chart shown in FIG. 7, a command value of a hydraulic pressure (a hydraulic pressure by EOP) which is supplied to the CVT 105 by the electric oil pump 109 is indicated by an alternate short and long dash line, and an actual value is indicated by a solid line.

In this way, a timing at which the electric oil pump 109 is controlled to start before an idling stop is brought about when the vehicle is being decelerated is set early when the deceleration is large and is set delayed when the deceleration is small by taking into consideration the time taken until the electric oil pump 109 supplies the desired hydraulic pressure to the CVT 105. As a result of this, the consumed power can be suppressed even when the electric oil pump 109 is driven before an idling stop is brought about.

Figure 8:
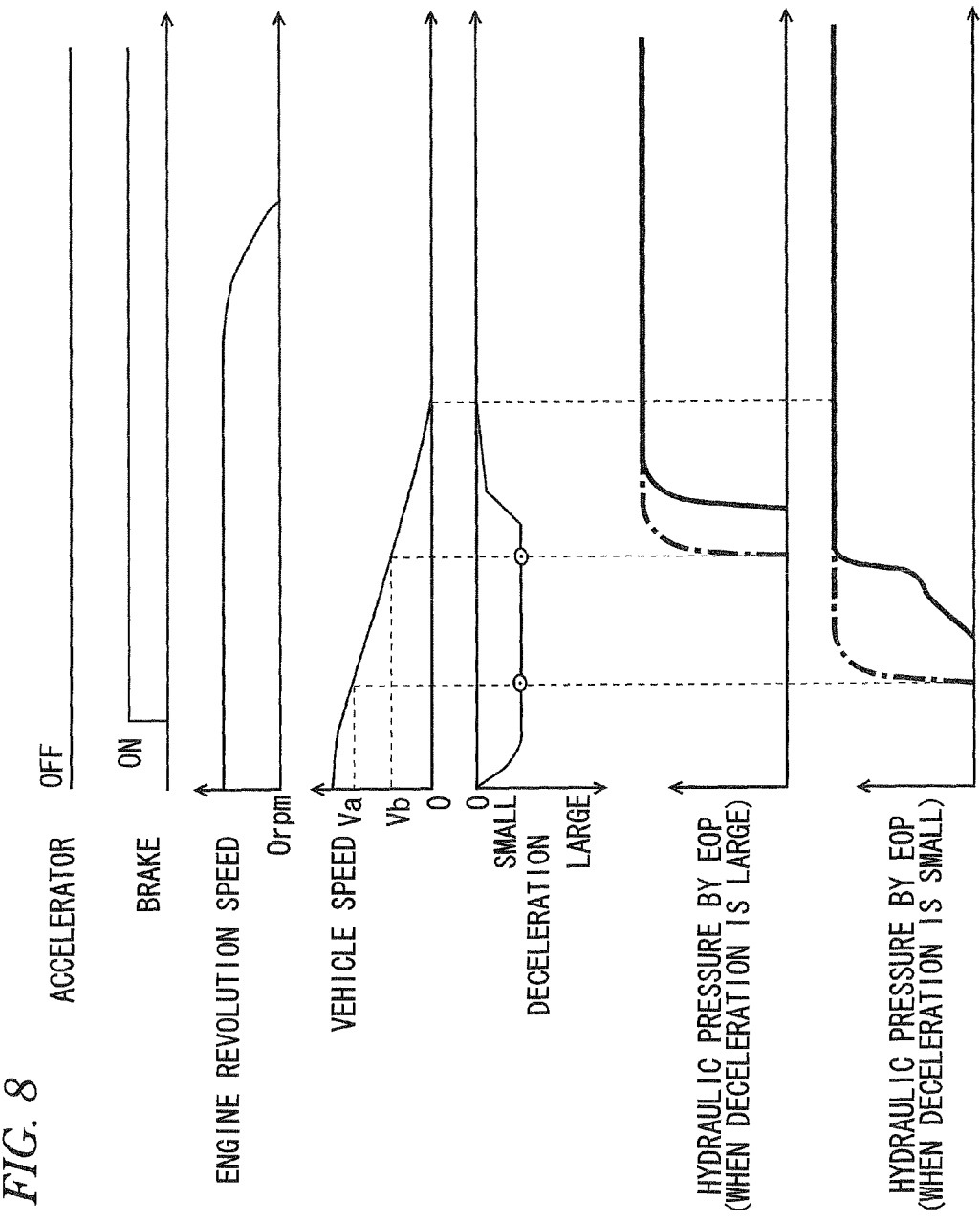
FIG. 8 is a time chart showing an example of a start timing of a start control of the electric oil pump 109 which is executed when the vehicle is being decelerated.

FIG. 8 is a time chart showing an example of a start timing of a start control of the electric oil pump 109 which is executed when the vehicle is being decelerated. As shown in FIG. 8, when the oil temperature stays constant in such a state that the accelerator pedal is not depressed and the brake pedal is being depressed, with the oil temperature being low, the electric oil pump 109 is controlled to start when the vehicle speed is Va, whereas with the oil temperature being high, the electric oil pump 109 is controlled to start when the vehicle speed is Vb which is slower than the vehicle speed Va. Some time is necessary from the electric oil pump 109 is controlled to start until the electric oil pump 109 actually supplies a desired hydraulic pressure to the CVT 105. Further, the viscosity of the working oil becomes high when the oil temperature is low. Therefore, more time is necessary or taken from the electric oil pump 109 is started until the hydraulic pressure reaches the desired value than when the oil temperature is high. In the time chart shown in FIG. 8, a command value of a hydraulic pressure (a hydraulic pressure by EOP) which is supplied to the CVT 105 by the electric oil pump 109 is indicated by an alternate short and long dash line, and an actual value is indicated by a solid line.

In this way, a timing at which the electric oil pump 109 is controlled to start before an idling stop is brought about when the vehicle is being decelerated is set early when the oil temperature is low and is set delayed when the oil temperature is high by taking into consideration the time taken until the electric oil pump 109 supplies the desired hydraulic pressure to the CVT 105. Consequently, even though a delay in response is generated in the actual hydraulic pressure supplied by the electric oil pump 109 due to the oil temperature being low, a state can be attained in which the electric oil pump 109 supplies the desired hydraulic pressure to the CVT 105 before an idling stop is brought about.

Figure 9:
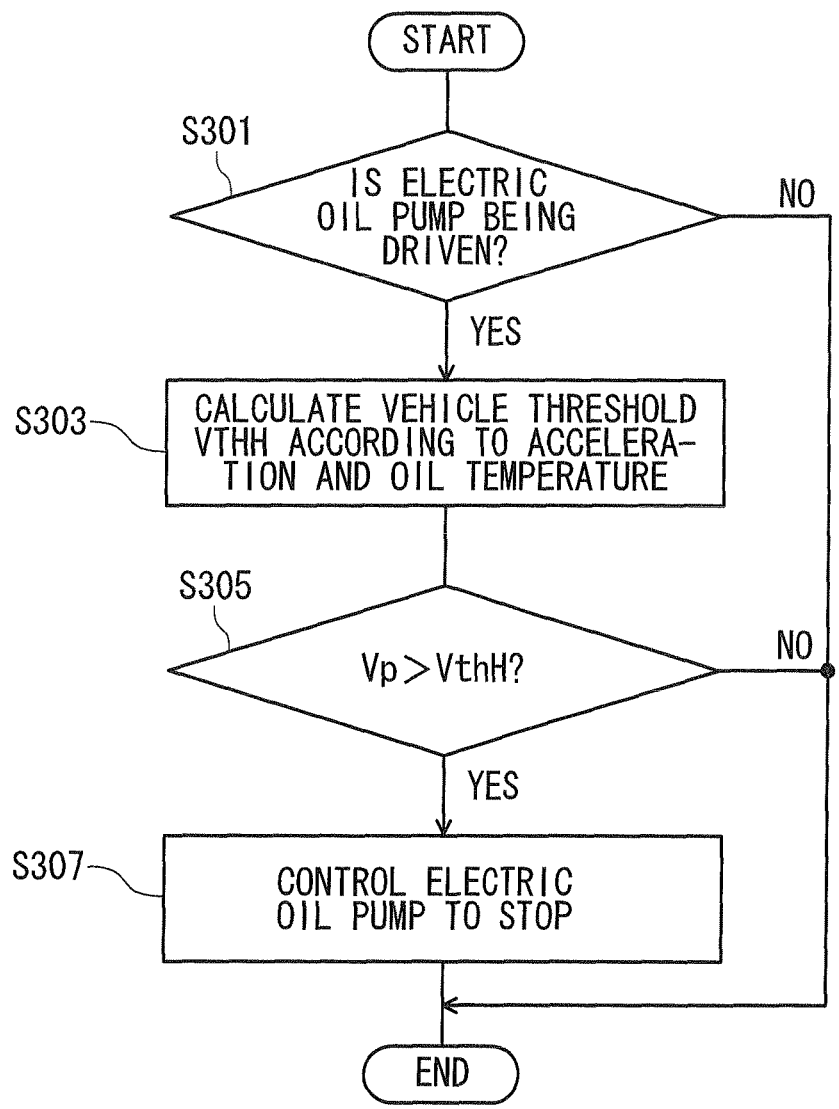
FIG. 9 is a flowchart showing operations performed by the management ECU 117 when the vehicle is shifted to be accelerated before the idling stop is brought about with the electric oil pump 109 kept driven.

FIG. 9 is a flowchart showing operations performed by the management ECU 117 when the vehicle is shifted to be accelerated before an idling stop is brought about with the electric oil pump 109 kept driven. As shown in FIG. 9, the management ECU 117 determines whether or not the electric oil pump 109 is being driven (step S301). If it is determined as a result of the determination that the electric oil pump 109 is being driven, the routine proceeds to step S303, whereas if it is determined that the electric oil pump 109 is not driven, this is the end of the series of operations. In step S303, the management ECU 117 calculates a vehicle speed threshold VthH according to the deceleration of the vehicle and the oil temperature by retrieving the map. Next, the management ECU 117 compares the vehicle speed Vp with the vehicle speed threshold VthH (step S305). If the vehicle speed Vp surpasses the vehicle speed threshold VthH (Vp>VthH), the routine proceeds to step S307. In step S307, the management ECU 117 starts to control the electric oil pump 109 to stop.

Figure 10:
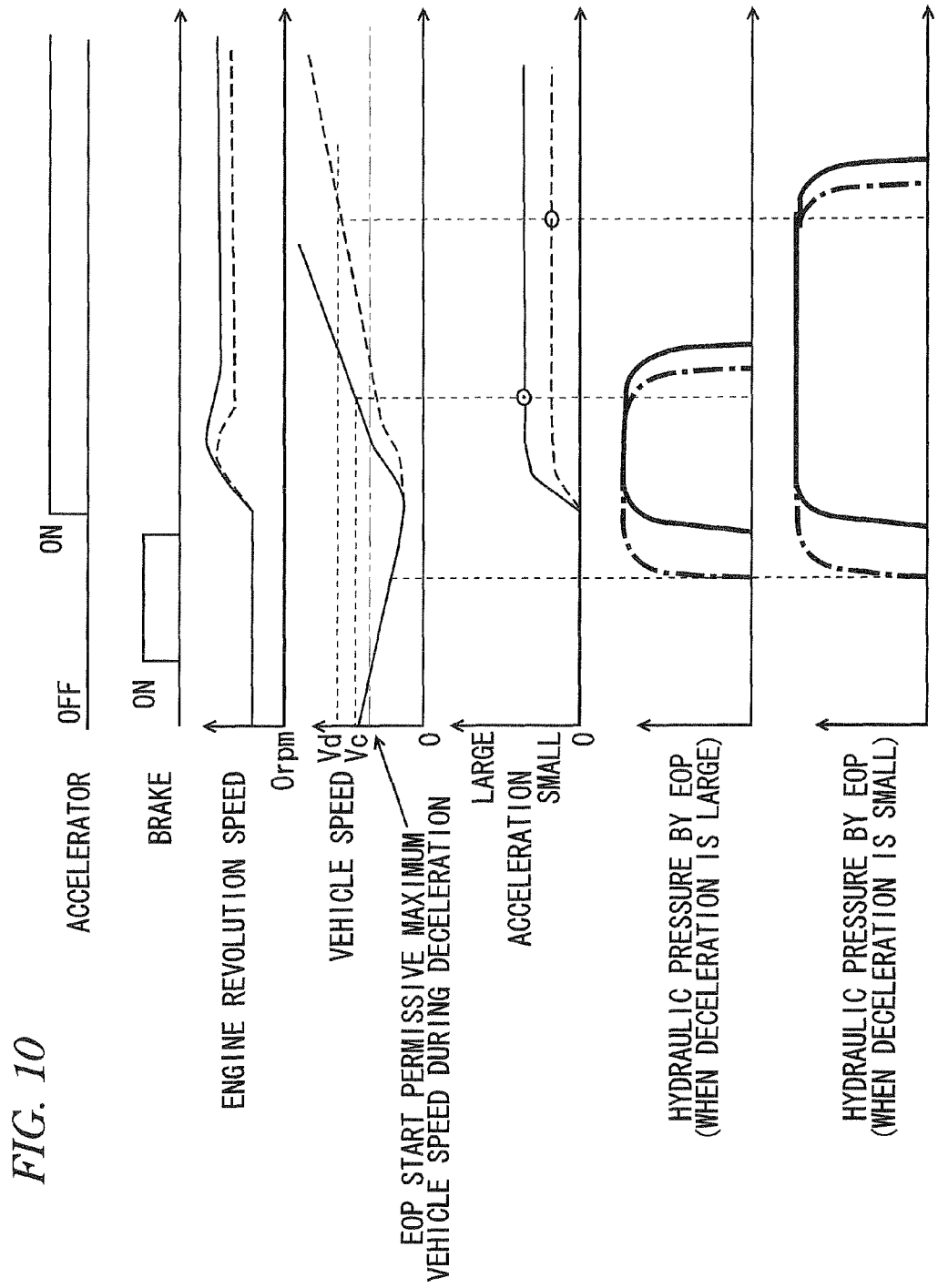
FIG. 10 is a time chart showing an example of a start timing of a stop control of the electric oil pump 109 when the vehicle is shifted to be accelerated.

FIG. 10 is a time chart showing an example of a start timing of a stop control of the electric oil pump 109 when the vehicle is shifted to be accelerated. As shown in FIG. 10, when the vehicle is shifted to be accelerated before an idling stop is brought about with the electric oil pump 109 kept driven, the electric oil pump 109 is started to be controlled to stop when the vehicle speed is Vc with the acceleration being large, whereas with the acceleration being small, the electric oil pump 109 is started to be controlled to stop when the vehicle speed is Vd which is higher than the vehicle speed Vc. Some time is necessary from the electric oil pump 109 is started to be controlled to stop until the hydraulic pressure supplied to the CVT 105 by the electric oil pump 109 actually becomes 0.

In the time chart shown in FIG. 10, supplies a desired hydraulic pressure to the CVT 105. a command value of a hydraulic pressure (a hydraulic pressure by EOP) which is supplied to the CVT 105 by the electric oil pump 109 is indicated by an alternate short and long dash line, and an actual value is indicated by a solid line.

In this way, a timing at which the electric oil pump 109 is controlled to stop when the vehicle is shifted to be accelerated before an idling stop is brought about with the electric oil pump 109 kept driven is set early when the acceleration is large and is set delayed when the acceleration is small. It is considered that the driver has a strong intention to accelerate the vehicle when acceleration is large, resulting in a low possibility that the vehicle is stopped immediately. In this way, the driving of the electric oil pump 109 can be stopped at an optimum timing matching the intention of the driver who runs the vehicle.

Figure 11:
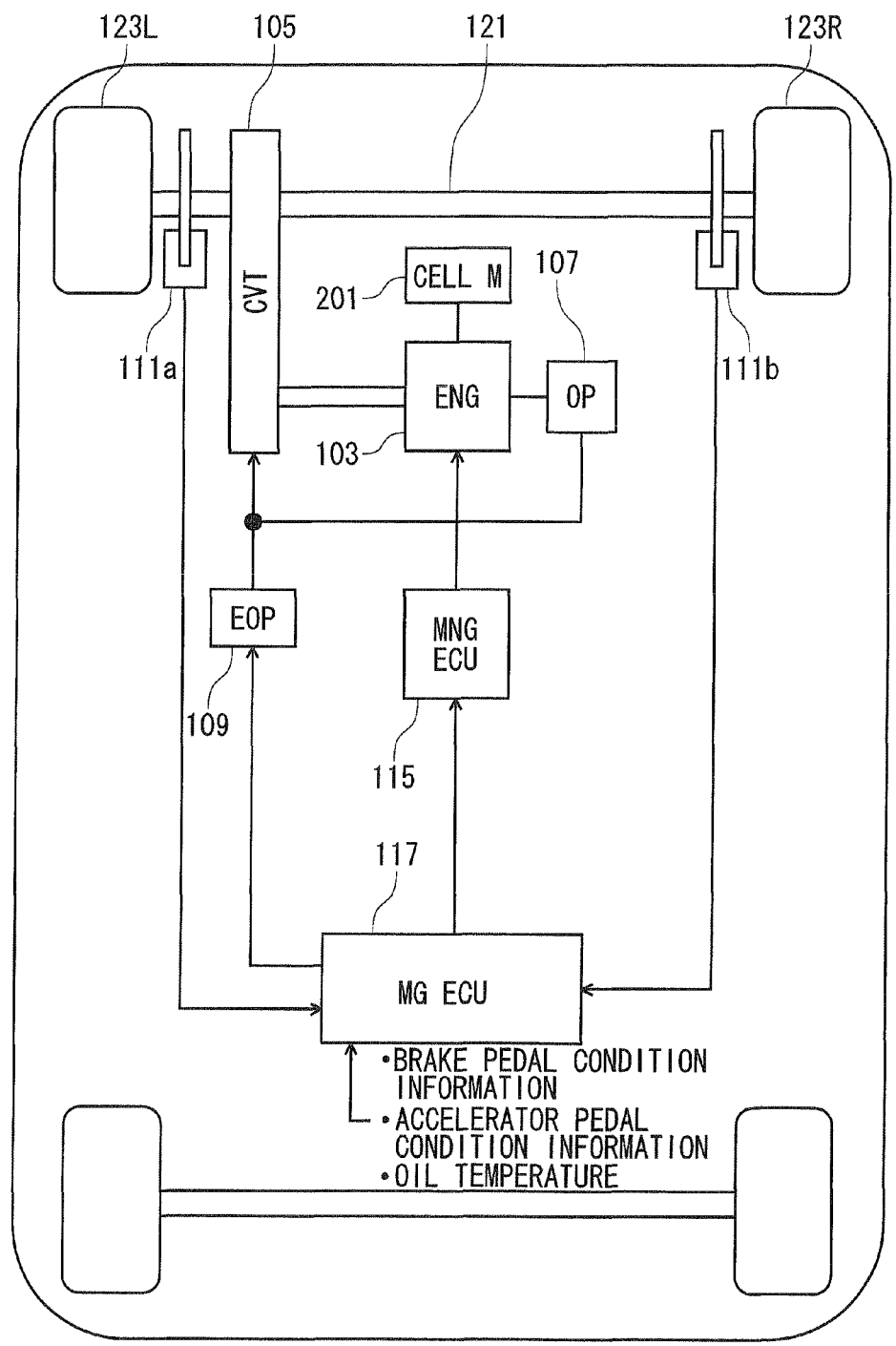
FIG. 11 is a block diagram showing an internal configuration of a vehicle of another embodiment.
Figure 12:
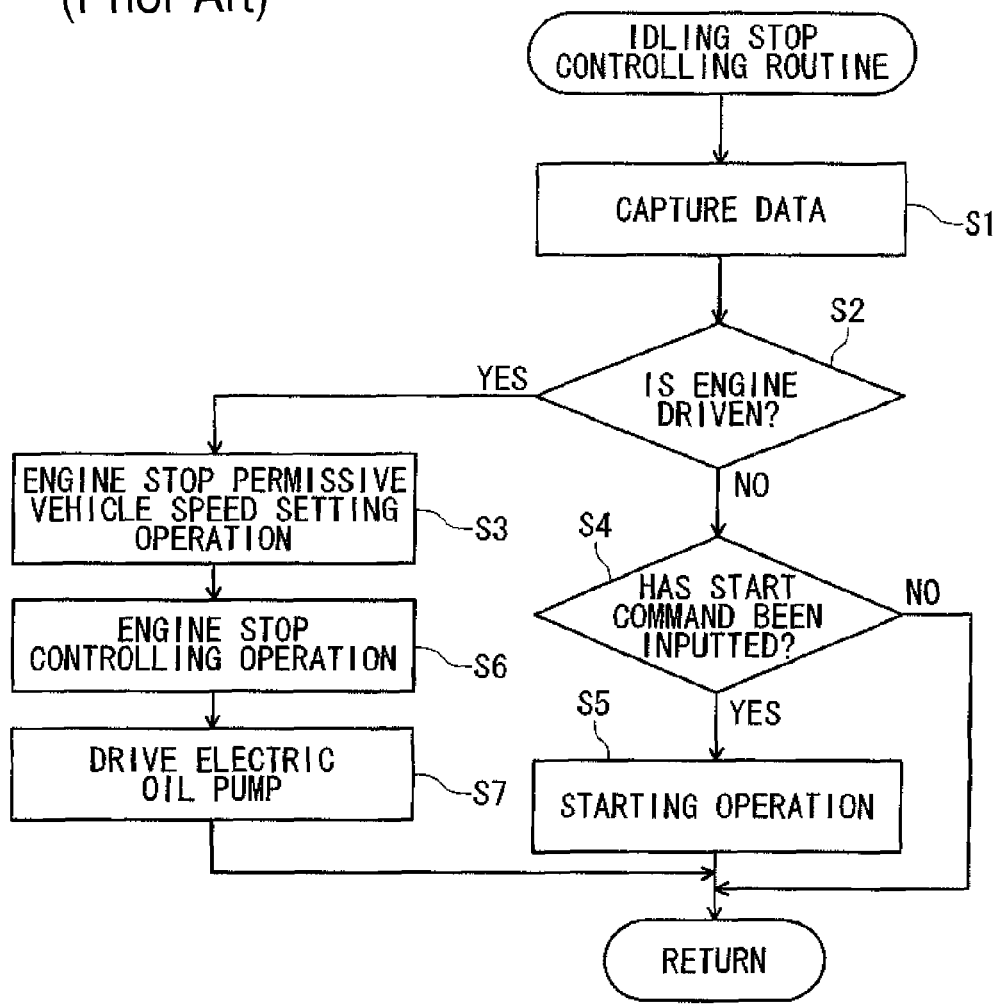
FIG. 12 is a flowchart of an idling stop controlling routine executed by an engine control system of Patent Literature 1.
Figure 13:
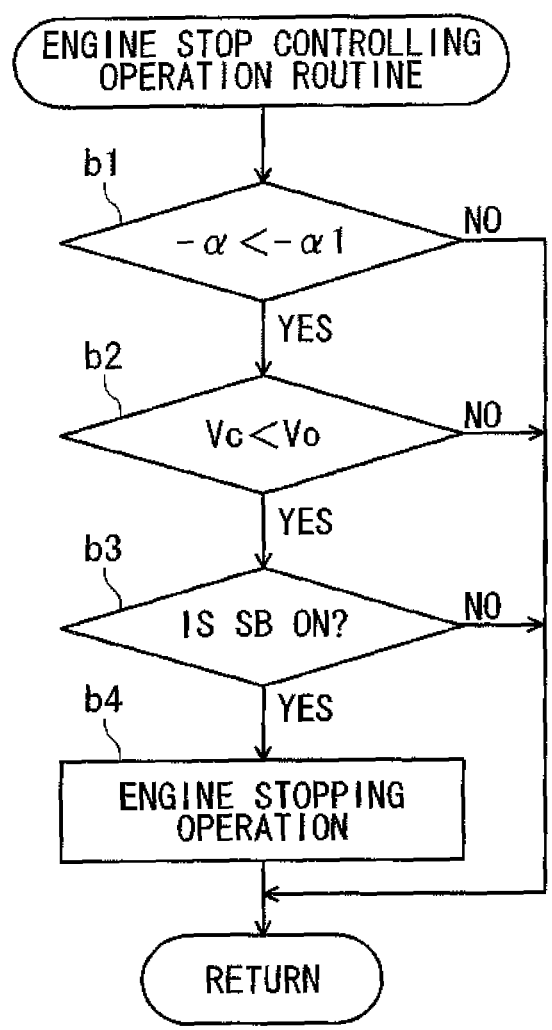
FIG. 13 is a flowchart showing an engine stop controlling routine executed by the engine control system of Patent Literature 1.

While the embodiment has been described heretofore by taking the HEV as an example, the invention also may be applied to a vehicle which includes only an internal combustion engine 103 as a drive source as shown in FIG. 11. In the case of the HEV, the internal combustion engine 103 is started by the electric motor 101. However, in the case of the vehicle which includes only the internal combustion engine 103 as the drive source, the internal combustion engine 103 is started by a self-starting motor M 201. In addition, an automatic transmission (AT) may be provided in place of the continuously variable transmission (CVT).

While the invention has been described in detail or by reference to the specific embodiments, it is obvious to those skilled in the art to which the invention pertains that the invention can be altered or modified variously without departing from the spirit and scope of the invention.

This patent application is based on Japanese Patent Application (No. 2009-262910) filed on Nov. 18, 2009, the contents of which are incorporated herein by reference.

DESCRIPTION OF REFERENCE NUMERALS 101 electric motor (MOT); 103 internal combustion engine (ENG); 105 continuously variable transmission (CVT); 107 mechanical oil pump (OP); 109 electric oil pump (EOP); 111a, 111b rotation speed sensor; 113 motor ECU (MOT ECU); 115 engine ECU (ENG ECU); 117 management ECU (MG ECU); 119 oil temperature sensor; 201 self-starting motor.

The invention claimed is:

1. A control system for a vehicle, the vehicle including:
a driving force generation unit which includes at least an internal combustion engine as a drive source;
an automatic transmission which changes a ratio of a rotation speed of an input shaft to which a driving force is inputted from the driving force generation portion to a rotation speed of an output shaft;
an electric oil pump which is driven by electric power supplied from a battery to supply a working hydraulic pressure to the automatic transmission; and
a vehicle speed detection unit,
wherein the control system executes an idling stop in the driving force generation unit, and
wherein the control system controls the electric oil pump to start before the idling stop is brought about, when a condition of a vehicle speed is satisfied which is set in accordance with a variation of a running speed of the vehicle while the vehicle is running based on the driving force generated by the driving force generation unit.

2. The control system of claim 1,
wherein a vehicle speed designated by a condition which is set when the vehicle is being decelerated is set low when the variation in running speed of the vehicle is small and is set high when the variation is large, and
wherein the control system controls the electric oil pump to start when the running speed of the vehicle decreases to the vehicle speed designated by the condition.

3. The control system of claim 1,
wherein a vehicle speed designated by a condition which is set when the vehicle is shifted to be accelerated before an idling stop is brought about with the electric oil pump kept driven is set high when the variation in running speed of the vehicle is small and is set low when the variation is large, and
wherein the control system controls the electric oil pump to stop when the running speed of the vehicle reaches to the vehicle speed designated by the condition.

4. The control system of claim 3,
wherein a vehicle speed designated by a condition which is set when the vehicle is shifted to be accelerated is higher than a vehicle speed designated by the condition which is set when the vehicle is being decelerated.

5. The control system of claim 1,
wherein the vehicle comprises an oil temperature detection unit which detects a temperature of a working oil that is supplied to the automatic transmission by the electric oil pump,
wherein a condition of the vehicle speed is set in accordance with a variation in running speed of the vehicle and a temperature of the working oil, and
wherein a vehicle speed designated by the condition of the vehicle speed set in accordance with a variation in running speed of the vehicle and a temperature of the working oil, is set lower as the temperature of the working oil increases in the event that the running speed of the vehicle stays constant.

* * * * *